United States Patent Office 3,052,601
Patented Sept. 4, 1962

3,052,601
PHENOLIC LAMPREY LARVICIDES
William J. Pyne, Painesville, Ohio, assignor to Diamond Alkali Company, Cleveland, Ohio, a corporation of Delaware
No Drawing. Filed July 10, 1956, Ser. No. 596,817
9 Claims. (Cl. 167—46)

This invention relates to new and improved biologically active compositions and their use, and more particularly relates to chlorinated nitrophenols and their application as biologically active materials especially as plant growth regulants and as lamprey larvicides.

In the many and diverse applications wherein biologically active materials are used, the limitations imposed by the specific use contemplated and/or the compounds heretofore known to exhibit the desired activity have, in many instances, severely restricted the use of such materials and added impetus to the search for new and improved materials.

A notable example is in the control of the sea lamprey, the eel-like parasitic creature which feeds on fish and which has been responsible for a tremendous fish slaughter in the Great Lakes in recent years. Control of the lamprey via chemical treatment which has become an increasingly important problem has heretofore been complicated by the fact that many substances effective as lampricides are either equally deadly to the fish and other desired aquatic life, or are so relatively ineffective that they are difficult and/or costly to use on a practicable scale.

Another area wherein prior art materials have not been completely satisfactory is in the field of plant growth regulants. Accordingly, here too, the search has continued for new and improved plant growth regulants for such applications as fungicides, herbicides, nematocides, and the like, as well as insecticides.

Hence, it will be appreciated that the expression "biologically active composition" as used herein is intended in a broad sense to refer to applications involving both plant growth regulants and animal like control materials, notably lampricides.

It is, therefore, a principal object of this invention to provide new and improved biologically active compositions.

It is a further object of this invention to provide a new and improved lampricide and method of controlling lampreys.

It is a still further object of the invention to provide a new and improved plant growth regulant.

Other objects and advantages of the invention will appear more fully from the following description thereof.

The present invention contemplates a biologically active composition containing as an essential active ingredient present in an amount sufficient to exert biological activity in use, a compound of the formula

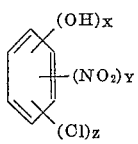

wherein X is 1 or 2, Y is 1 or 2, and Z is a number from 1 to 6—X—Y. Thus it will be appreciated that compounds of this invention may be termed chlorinated nitrophenols such as polychloronitrophenols, including polychlorodinitrophenols, or polychloromononitrophenols. More specifically, illustrative compounds include tetrachloronitrophenols, trichloromononitrophenols, trichlorodinitrophenols, dichloromononitrophenols, dichlorodinitrophenols, monochloromononitrophenols, monochlorodinitrophenols and diphenol derivatives of the foregoing types.

Specific illustrative compounds of the above types are:
2,5-dichloro-4-6-dinitrophenol (M.P. 146–7° C.)

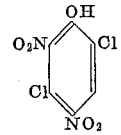

6-chloro-2,4-dinitro-1,3-resorcinol (M.P. 91–2° C.)

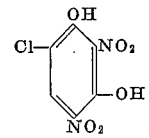

2,5-dichloro-4-nitrophenol (M.P. 117° C.)

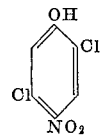

Of the above specific compounds, 2,5-dichloro-4-nitrophenol is the presently preferred active ingredient in biologically active compositions of this invention, and is especially useful as a lampricide which is effective even at low concentrations in the control of lamprey in the larval stage and as a plant growth regulant as will be set forth in some detail hereinafter.

Generally, compounds of this invention may be prepared by nitration of a chlorinated phenol, chlorination of nitrophenols, or the like, the former procedure generally being preferred using nitric acid, a mixture of nitric acid and sulfuric acid or other nitrating agent. Thus, 2,5-dichloro-4-nitrophenol can be prepared by combining nitric acid and 2,5-dichlorophenol.

The practice of this invention is especially advantageous in the control of lamprey via addition of compounds of this invention to water containing, or otherwise contacting, a larval form of lamprey. The life cycle of lampreys generally comprise 6½ to 7½ years, about 4 to 6 years of which are spent in the larval form, including the transformation or emergence from the larval form, during which form control via chemical toxicant contact is most readily accomplished. It has been found that compounds of this invention exhibit a high degree of lampricidal activity even in extremely low concentrations, e.g., 3 to 12 parts active toxicant per million parts of water containing lamprey larvae.

Generally it is advantageous to introduce the active ingredient into the water while dissolved in a solvent miscible or emulsifiable with water, e.g., 2,5-dichloro-4-nitrophenol dissolved in acetone, various alcohols or the like.

The use of compounds of this invention also is contemplated in formulating various plant growth regulating compositions such as fungicides, herbicides including pre- and post-emergent herbicides, both as soil additives and foliage sprays, nematocides and the like, as well as insecticides. In such applications, it generally is desirable to employ a compound of this invention in a minor amount as the essential active ingredient and to utilize a major amount of a carrier. As used throughout the specification and claims, the term "carrier" is intended to include various materials, both liquid and/or solid, i.e., finely-divided materials, and contemplates the use of such substances as extenders, diluents, solvents, fillers, conditioners, and the like. There also may be included, of course, where necessary, minor amounts of emulsifiers or other surface active agents when emulsions, suspensions or emulsifiable concentrates are desired. Illustrative carriers are liquids such as water and diverse organic solvents including various petroleum fractions, blends, and mixtures thereof, e.g., kerosene, acetone, alcohols, oils and the like, and finely-divided solids such as talc, clays, diatomaceous, spent catalyst, gels, soil, or other substances.

In order that those skilled in the art may more completely understand the present invention and the preferred methods by which the same may be carried into effect, the following specific examples are offered:

EXAMPLE I

Part A

PREPARATION OF 2,5-DICHLORO-4,6-DINITROPHENOL

To 40 gms. (0.245 mol) of 2,5-dichlorophenol dissolved in 125 ml. chloroform are added dropwise over a period of three hours, 65 ml. of 70% nitric acid. The resultant solution is cooled and 49 gm. of a yellow solid crystallizes out. This crude product is recrystallized from benzene and the thus-purified 2,5-dichloro-4,6-dinitrophenol melts at 146–7° C.

Part B

Using the product of Part A as an insecticide, a percentage mortality, at a rate of 64 lbs./acre on plants against Aphid Syst. is 91% as compared with an untreated test mortality value of 14%.

Part C

The product of Part A is evaluated as a fungicide and exhibits moderate activity in a spore germination test against the fungi *Alternaria oleracea* and *Monilinia fructicola*. In a test involving application to tomato foliage, there is observed against early blight a 79% and 74% disease control, respectively, at concentrations of 2000 and 400 parts per million; against late blight at the same concentrations there is observed an 89% and 74% disease control, respectively.

Part D

In herbicidal tests, the product of Part A exhibits a moderate activity against radish and rye grass seed germination in Petri dishes and when applied to bean foliage as a spray in a concentration of 6400 parts per million.

Part E

In nematocidal tests, the product of Part A is applied to nematode-infested soil around tomato plants at a dosage of about 0.4 gm. per plant. There is observed some plant stunting but no phytotoxic effects, and a resultant infection rating of 3 compared to a rating of 4.3 for an untreated comparative sample. In a further test wherein the product of Part A is used as a contact nematocide against *Panagrellus redivivus* at a concentration of 1000 parts per million, there is observed a 100% nematode mortality as against an untreated check test value of 4% mortality.

EXAMPLE II

Part A

PREPARATION OF 6-CHLORO-2,4-DINITRO-1,3-RESORCINOL

Into a 500 ml., 3-neck, round bottom flask equipped with a stirrer, thermometer, reflux condenser and dropping funnel are introduced 54.0 gm. (0.2 mol) 2,4,5-trichloro-1,3-dinitro-benzene suspended in 50 ml. water. This mixture is warmed to 50° C. and 21 ml. of NaOH (98%, flake dissolved 77.5 ml. water) is added and heating continued. At 100° C. another 21 ml. NaOH solution is introduced. The thus-formed mixture is then heated at 103–5° C. for 4 hours after which 2 more 21 ml. portions of the NaOH solution are added at half-hour intervals at 103–5° C. The heavy organic layer slowly changes to a finely-divided solid.

At the end of the heating period, the mixture is diluted with 25 ml. water, heated a few minutes more, and diluted with 50 ml. water and cooled with stirring. The reaction mixture is then filtered and the residue washed with cold water until the filtrate is orange-yellow. The wet filter cake is slurried in 75 ml. water and stirred into 25 ml. concentrated HCl and ice. The brownish-yellow precipitate is filtered off, washed with water and dried.

This material is then dissolved in 300 ml. boiling carbon tetrachloride, boiled with carbon and the orange-yellow filtrate concentrated to about 200 ml. and allowed to stand and crystallize out. The thus-obtained 6-chloro-2,4-dinitro-1,3-resorcinol is washed with cold $CCl_4$, dried, and melts at 91–92° C.

Part B

The product of Part A when tested as a herbicide exhibits a high degree of activity when applied as a foliage spray. At a concentration of 6400 parts per million ratings of 11, 9, 3 and 5, respectively, are obtained against tomato, bean, corn and oats as against a zero rating for untreated plants.

Tests conducted via soil watering using the product of Part A in a concentration of 128 lbs. per acre yield phytotoxicity values of 6 and 11, respectively, against tomato and bean plants in comparison with zero values obtained on untreated plants. A moderate activity also is observed against radish and rye grass seed germination in Petri dish tests.

Part C

Pre-emergent herbicidal tests are conducted by applying the product of Part A in a concentration of 64 lbs. per acre. The resultant percentage stand as compared to control is 50% re broadleaf and 75% re grass, with some stunting and chlorosis of the broadleaf noted.

Part D

In nematocidal tests, the product of Part A exhibits a 100% kill (24 hours) of *Panagrellus redivivus* when used as a contact nematocide in a concentration of 1000 parts per million in comparison with a check test mortality value of 4%.

EXAMPLE III

Part A

PREPARATION OF 2,5-DICHLORO-4-NITROPHENOL

To 40 gm. (0.245 mol) of 2,5-dichlorophenol dissolved in 120 ml. chloroform are added 21 gm. 70% nitric acid dropwise over a half hour period during which period the reaction temperature rises to 50° C. The reaction mixture is then cooled to room temperature and a yellow solid crystallizes out. This solid is recrystallized from carbon tetrachloride and the thus-purified 2,5-dichloro-4-nitrophenol melts at 117° C.

Part B

The product of Part A is tested as an insecticide against several insects on plants at a concentration of 2000 parts per million. The percentage insect mortality is as follows:

| Bean Beetle | Roach | Mite | Aphid |
|---|---|---|---|
| [1] 45 | 95 | 100 | 100 |

[1] Greater than 50% feeding inhibition.

Part C

In a fungicidal evaluation, the product of Part A, when employed in a sport germination inhibition test on glass slides against the fungi *Alternaria oleracea* and *Monilinia fructicola* exhibits a moderate degree of germination inhibition.

Part D

When tested as a herbicide, the product of Part A exhibits a high degree of activity in seed germination Petri dish tests against radish and rye grass seeds. In foliage spray tests at a concentration of 6400 parts per million a phytotoxicity rating of 11, representing a killing of the plant, is observed against tomato and bean foliage while corresponding values of 5 and 8, respectively, against corn and oats are noted. In tests wherein the product of Part A is applied at a rate of 128 lbs. per acre to the soil via watering, a high degree of herbicidal action is observed, as evidenced by a rating of 11.

Part E

A further herbicidal test is conducted to demonstrate pre-emergent herbicidal activity using the product of Part A at a rate of 64 lbs. per acre. The percentage stand of broadleaf and grass, respectively, compared to an untreated control, is 0 and 5, thus indicating a singularly high pre-emergent activity.

Part F

To demonstrate post-emergent herbicidal activity, the product of Part A is applied as a foliage spray against several plants with the results tabulated below:

| Concentration (p.p.m.) | Tomato | Bean | Corn | Oats |
|---|---|---|---|---|
| 3,200 | [1] 11 | 11 | 11 | 11 |
| 1,600 | 11 | 11 | 11 | 11 |
| 800 | 11 | 11 | 11 | 10 |
| 800 | 11 | 11 | 5 | 5 |
| 400 | 11 | 11 | 3 | 5 |
| 200 | 3 | [2] 10 | 0 | 4 |
| Check (0) | 0 | 0 | 0 | 0 |

[1] 11 means plant killed.
[2] Defoliated.

Part G

In soil watering tests wherein the product of Part A is applied to the soil, the following herbicidal effects are observed:

| Dosage, lbs./acre | Tomato | Bean |
|---|---|---|
| 64 | [1] 11 | 11 |
| 32 | 11 | 11 |
| 16 | 11 | 8 |
| 8 | 1 | 9 |
| 0 | 0 | 0 |

[1] 11 means plant killed.

Part H

In nematocidal testing, the product of Part A employed as a contact nematocide exhibits a 100% kill of *Panagrellus redivivus* after 24 hours, using a concentration of 1000 parts per million. An untreated check test indicates a 3% mortality.

EXAMPLE IV

To demonstrate the singular effectiveness of compounds of this invention when used in the control of lamprey, experiments are conducted using 2,5-dichloro-4-nitrophenol as a lampricide in accordance with the following procedure.

Into 8 liter glass battery jars each containing 5 liters of water, aerated via stone-air beakers and maintained at constant temperature, are introduced 2,5-dichloro-4-nitrophenol in acetone solution at different concentrations 5 hours before specimens are placed in the jars, the temperature initially being maintained at 55° F.

Into the thus-prepared jars are introduced as specimens (1) larvae of the sea lamprey (*Petromyzon marinus*) and two species of fish, i.e., (2) rainbow trout (*Salmo gairdnerii*) and (3) bluegill sunfish (*Lepomis macrochirus*) of a fingerling size (4 inches or less). Two specimens of each of the three specimens are used. Observations are made 6 times during a 24 hour period following introduction of the specimens to determine the toxic effect of the 2,5-dichloro-4-nitrophenol.

As a result of such tests at varying temperatures, it is found that concentrations of 2,5-dichloro-4-nitrophenol as low as 3 to 12 parts per million exhibit a singularly high killing of the lamprey larvae while not harming the fish specimens. Hence, it will be appreciated that 2,5-dichloro-4-nitrophenol not only is highly effective as a lampricide but also selective in its action.

It is to be understood that although the invention has been described with specific reference to particular embodiments thereof, it is not to be so limited, since changes and alterations therein may be made which are within the full intended scope of this invention as defined by the appended claims.

What is claimed is:

1. In the control of lamprey the improvement which comprises adding to water containing lamprey larvae a larvicidal amount of a polychloronitrophenol selected from the group consisting of polychloromononitrophenols and polychlorodinitrophenols.

2. In the control of lamprey the improvement which comprises adding to water containing lamprey larvae about 3 to 12 p.p.m. of a polychloromononitrophenol.

3. The method of controlling lamprey which comprises adding to water containing lamprey larvae a larvicidal amount of a dichloronitrophenol selected from the group consisting of dichloromononitrophenols and dichlorodinitrophenols.

4. The method of controlling lamprey which comprises adding to water containing lamprey larvae a larvicidal amount of a dichloromononitrophenol.

5. The method of controlling lamprey which comprises adding to water containing lamprey larvae a larvicidal amount of 2,5-dichloro-4,6-dinitrophenol.

6. The method of controlling lamprey which comprises adding to water containing lamprey larvae a larvicidal amount of 6-chloro-2,4-dinitro-1,3-resorcinol.

7. The method of controlling lamprey which comprises adding to water containing lamprey larvae a larvicidal amount of 2,5-dichloro-4-nitrophenol.

8. The method of controlling lamprey which comprises adding to water containing lamprey larvae about 3 to 12 p.p.m. of 2,5-dichloro-4-nitrophenol.

9. In the control of lamprey the improvement which comprises adding to water containing lamprey larvae a larvicidal amount of a chlorinated mononitrophenol.

References Cited in the file of this patent

UNITED STATES PATENTS

| 2,166,121 | Boyce | July 18, 1939 |
| 2,210,945 | Mills | Aug. 13, 1940 |
| 2,850,537 | Hoesser | Sept. 2, 1958 |

OTHER REFERENCES

Dewitt et al.: "Relationship Between Chemical Structures and Toxic Action on Rats," Chem.-Biol. Coordination Center, Review No. 5, Nat. Res. Council, Washington, D.C., May 8, 1953, pp. 1–6 and 21.

King: "Chemicals Evaluated as Insecticides," U.S. Dept. of Agri. Handbook, No. 69, pp. 1–6 and 260, May 1954.

Blanksma: Chem. Abstracts, vol. 2 (1908), pp. 1133–34 (2 pp.).

Fries: Chem. Abstracts, vol. 21 (1927), p. 2692 (1 p.).

Bradbury et al.: Chem. Abstracts, vol. 48 (1954), p. 10,285 (1 p.).

Fries: Ann. der Chem., vol. 454 (1927), p. 247 (1 p.).